United States Patent [19]

Hawtree

[11] 4,264,854
[45] Apr. 28, 1981

[54] ELECTRIC MOTOR AND CONTROL SYSTEM

[76] Inventor: James S. Hawtree, 1732 New Lenox Rd., Joliet, Ill. 60433

[21] Appl. No.: 52,853

[22] Filed: Jun. 28, 1979

[51] Int. Cl.³ .......................... H02P 7/36; H02P 5/28; H02P 5/34
[52] U.S. Cl. .................... 318/809; 318/716; 318/724
[58] Field of Search ............... 318/731, 732, 716, 717, 318/720, 723, 724, 729, 737, 748, 775, 777, 809

[56] References Cited

U.S. PATENT DOCUMENTS

| | | | |
|---|---|---|---|
| 2,168,170 | 8/1939 | Mittag | 318/138 |
| 2,201,006 | 5/1940 | Kilgore | 318/731 X |
| 2,896,143 | 7/1959 | Bekey | 318/197 |
| 3,144,595 | 8/1964 | Graybeal | 318/197 |
| 3,189,886 | 6/1965 | Sonntag | 318/724 X |
| 3,195,032 | 7/1965 | Shonnard et al. | 318/720 |
| 3,401,321 | 9/1968 | Miki | 318/717 X |
| 3,453,515 | 7/1969 | Millois et al. | 318/748 X |
| 3,519,909 | 7/1970 | Mathias et al. | 318/731 X |
| 3,531,701 | 9/1979 | Shibata | 318/731 X |
| 3,758,836 | 9/1973 | Shibata | 318/732 |
| 3,887,852 | 6/1975 | Fernandes et al. | 318/732 |
| 3,904,942 | 9/1975 | Holtz | 318/135 |
| 4,039,909 | 8/1977 | Baker | 318/197 |

Primary Examiner—Benjamin Dobeck
Assistant Examiner—Richard M. Moose
Attorney, Agent, or Firm—Evan D. Roberts

[57] ABSTRACT

A control system regulates operation of an electrical motor having multiple stator and rotor coils by regulating the phase displacement (1) between the rotor and stator energizing signals, (2) between the signals passed to the individual rotor coils, and (3) between the signals passed to the individual stator coils. A recorder coupled to the lines over which the phase-regulating signals are supplied to the rotor and stator coils can record these signals for later application to the motor to repeat the initial movement. Additionally displacement of the motor shaft produces signals which can be recorded for later duplication of the original shaft displacement. The phase-regulating signals for the rotor and stator coils can be supplied from a variable frequency oscillator, or a data processor, or any other suitable source.

15 Claims, 9 Drawing Figures

ELECTRIC MOTOR AND CONTROL SYSTEM

BACKGROUND OF THE INVENTION

Over the years the fundamental electric motor construction has been improved in various ways, to facilitate better speed control and/or better operating characteristics, such as smooth operation in a stepping mode with minimum cogging. Other improvements have been made to regulate the speed and/or torque of the motor. One such approach is described in U.S. Pat. No. 4,039,909—Baker, entitled "A Variable Speed Electronic Motor And The Like." This patent describes a system for regulating the amplitude and frequency of the different voltages applied to the stator and to the rotor. As indicated, this is done with slip rings and the motor construction is generally conventional. However, even with such arrangements, there is still a real need for an improved motor in a control system which admits of even more precise control, operation as a stepping motor, and in a manner that does not exhibit cogging.

It is therefore a primary object of the present invention to provide an improved motor and control circuit which provides more precise control of output speed, torque, power factor, and physical displacement of the output shaft than is possible with known devices.

It is a more specific object of the invention to provide such a motor and associated control circuit in which the interacting magnetic fields of the rotor and stator can be "shaped" or regulated to provide different operational characteristics.

In general, an electrical motor can be considered a device for translating electrical energy into mechanical motion. Another important object of the invention is to provide an electrical motor which is functionally reversible. That is, a mechanical motion imposed upon the motor will cause the motor to produce electrical signals for storage, and subsequent playback of such stored signals will recreate the initial mechanical motion of the motor.

SUMMARY OF THE INVENTION

The combination of a motor and associated control system constructed in accordance with the present invention includes an electrical motor which has a stator with a plurality of stator coils spaced at regular intervals. The rotor is mounted on a shaft, and has a plurality of rotor coils spaced at regular intervals, which intervals may be different than the intervals of the stator coil spacing. Means is provided for passing a first series of electrical signals to the stator coils, and another means is provided to pass a second series of electrical signals to the individual rotor coils. The invention further includes a plurality of phase shift means, each of which is respectively coupled to one of the coils of the stator and of the rotor. These phase shift means or circuits effect a phase displacement of the signal actually applied to the associated coil (of the stator or rotor), with respect to the phase of the signal applied to the adjacent coils.

In accordance with another aspect of the invention, each of the phase shift means can be made individually adjustable, to vary the amount of the phase shift effected by each particular adjustable means.

Those skilled in the art will recognize that a plurality of operational amplifiers can be provided, and individually coupled in series with each of the phase shift means or circuits, to drive the individual coils of the rotor and stator. With the present state of the art, the operational amplifiers and phase shifters can be made of integrated circuits and thus mounted entirely within the motor for a compact, efficient system.

THE DRAWINGS

In the several figures of the drawings, like reference numerals identify like components, and in those drawings.

DETAILED DESCRIPTION OF THE INVENTION

Figure 1:
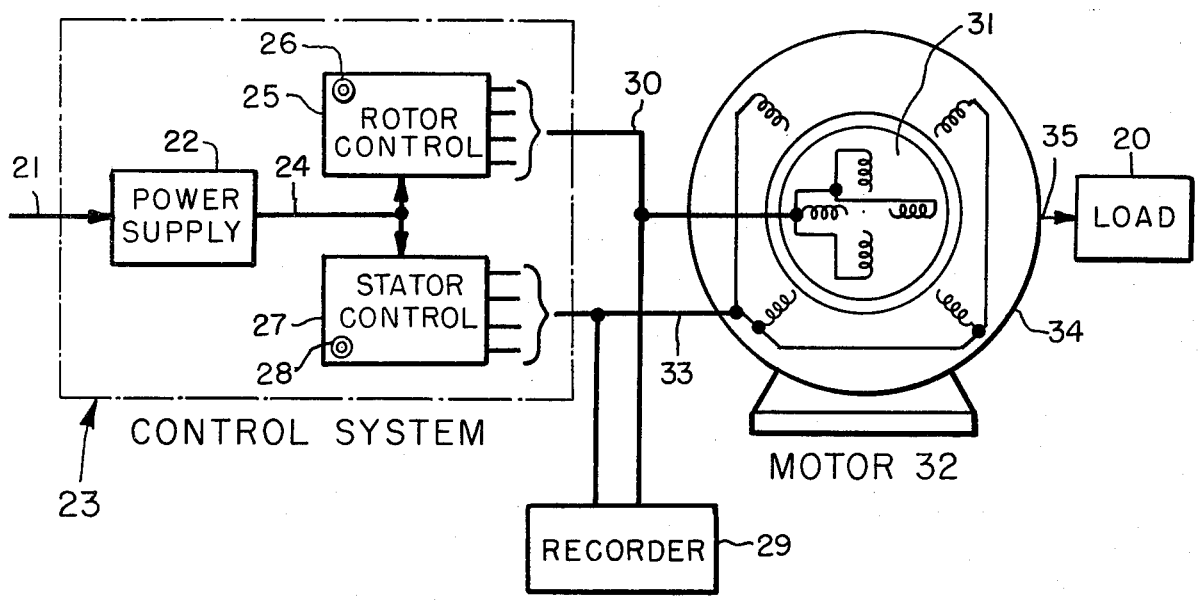
FIG. 1 is a block diagram depicting a general layout of the invention, including the motor and associated control system.

FIG. 1 shows in a general layout the main components of the inventive system for supplying any suitable load, designated 20 in the illustration. Input a-c energy is received over a line 21 to energize the power supply 22 in the control system 23 of the invention. Those skilled in the art will understand that a single line such as 21 may represent two or more conductors, but for the sake of simplicity a single line serves to depict the power and/or signal flow. The power supply provides an output energizing voltage on line 24 to both the rotor control stage 25 and the stator control stage 27 within the control system 23. Rotor control circuit 25 includes an adjustable means 26, depicted as a simple rotatable knob, for providing a plurality of phase-shifted signals over a plurality of output conductors which are then passed in a single cable 30 to the individual windings within rotor 31 of the motor 32. As will become apparent, the actual phase-displacement or phase-shifting means is included within the rotor structure in a preferred embodiment. For simplicity it is sufficient to indicate that there are in fact phase-shifted signals and they can be adjusted by some means to vary the phase relationship of the signals individually applied to the several windings within the rotor 31. In a similar manner the knob 28 represents means for adjusting the phase of each respective output signal from stator control circuit 27, passed over individual conductors gathered within a cable 33, for application to the individual windings within the stator 34. As electrical energy is transferred to the rotor and stator, the rotor is rotated in a conventional manner to drive the motor shaft represented by the line 35 and pass mechanical work to the load 20.

For purposes of illustration in FIG. 1, both the rotor and the stator are shown with four individual coils, and it is understood that each is separately connected to a conductor so that a signal of a given phase, different than the phase of the signal on each adjacent coil, can be applied to each winding. However it should also be understood that different numbers of rotor and stator coils, such as 8, 16 or any other number, can be utilized. In addition the rotor and stator need not have precisely the same number of coils, but they can be different to achieve different rotational and torque effects. Moreover the motor need not be a conventional generally round configuration; it can be a linear motor to displace a vehicle along an extended, not necessarily linear, track.

Figure 2:
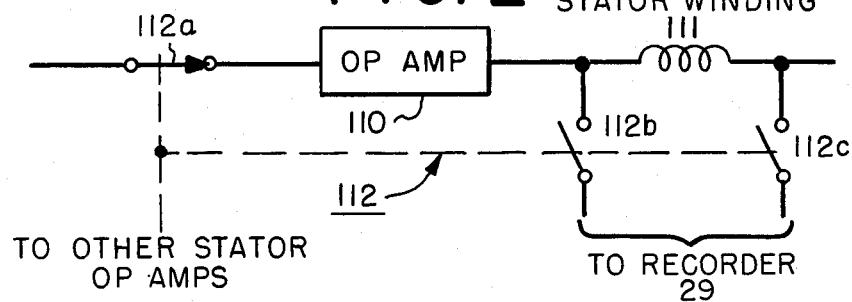
FIGS. 2 and 3 are partial schematic diagrams useful in understanding the operation of the system shown in FIG. 1.

In accordance with another aspect of the invention, a recorder 29 is coupled to the separate lines 30 and 33 over which the rotor and stator signals are passed to the motor. By using a multi-channel recorder, the different signals for the rotor and the stator can be recorded and played back at a later time to precisely duplicate the motor operation in accordance with the signals passed to the motor in real time. In addition, if signals from load 20 are used to displace shaft 35 and effect a displacement of the rotor 31, this in turn will induce a signal in the stator windings and in the rotor windings, and these signals can be recorded on the recorder 29. In this recording mode, the connections to the rotor windings remain the same. As will be explained hereinafter, the individual windings of the rotor and the stator are coupled in series with operational amplifiers to amplify the signals from the control circuits. For example, in FIG. 2 an operational amplifier 110 is shown coupled in series with one of the stator windings 111. In the recording mode, a disconnect switch 112 is provided, with individual contacts 112a, 112b and 112c, in addition to contact sets (not shown) for interrupting the power and signal flow to all the other operational amplifiers for the stator windings. Switch 112 is displaced from its illustrated position to effect the recording, so that there is no energy passed to any of the stator windings, and a circuit is completed over the contacts 112b, 112c to the stator track of the recorder 29. Thus the rotor and stator signals are received and recorded, and by playing the signals back at a later time, the motor output shaft displacement can be recreated in accordance with the initial angular displacement of the shaft which provided the signals to the recorder.

Figure 3:
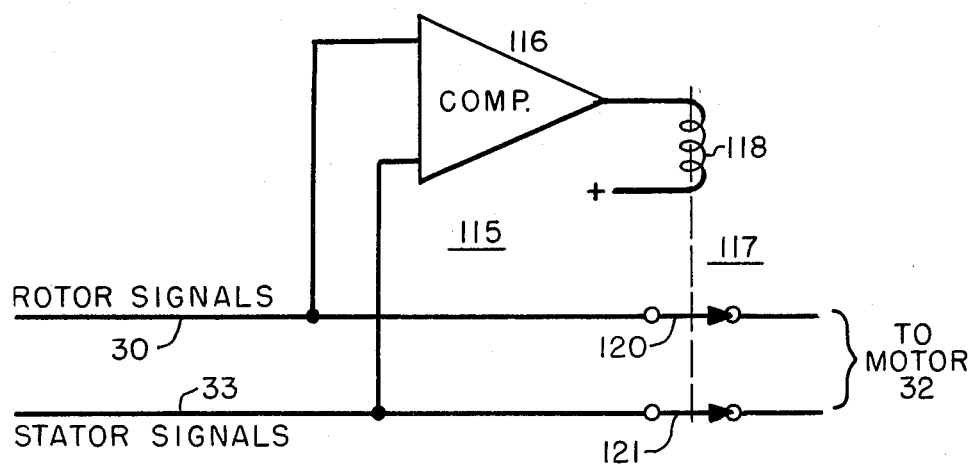

FIG. 3 shows another feature of the invention, the incorporation of an overspeed protection circuit 115 in the system. As there shown, a comparator 116 is connected to receive a portion of both the rotor and stator signals, thus providing a continuous monitoring of the frequency difference in the signals which is related to the motor overspeed. Above a preset maximum desired speed, comparator 116 switches and completes an energizing circuit for relay 117, which includes a winding 118 and contacts 120, 121. Relay 117 operates and interrupts the circuit which normally passes the control signals to the rotor and stator windings. Those skilled in the art will appreciate the overspeed protection circuit 115 can be provided externally of the motor, or mounted within the motor housing.

Figure 4:
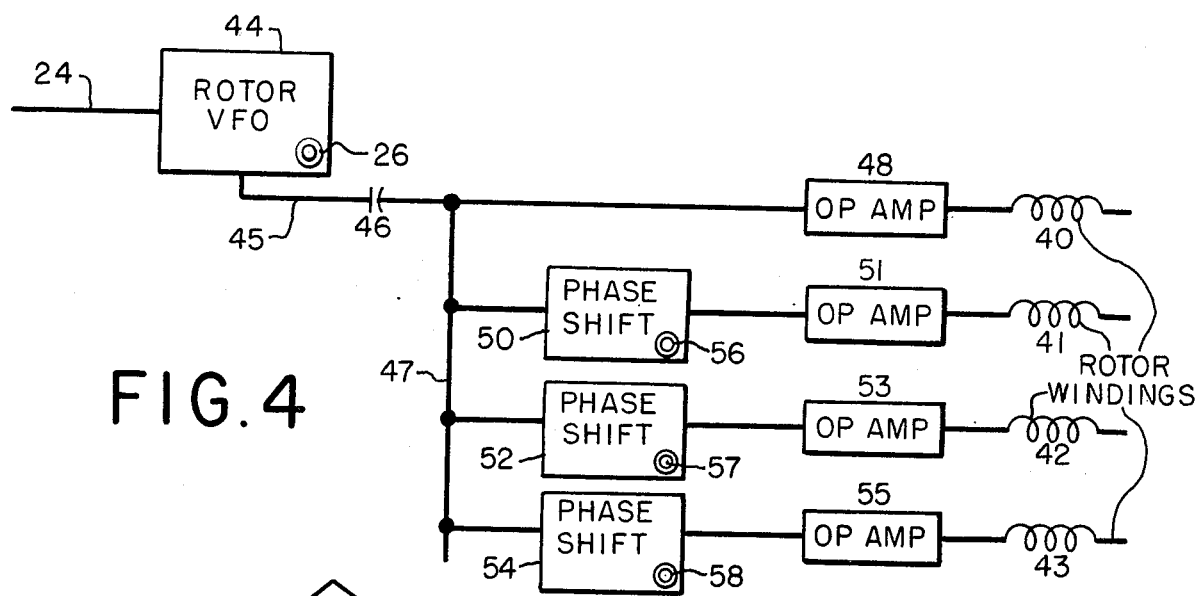
FIG. 4 is a block diagram depicting one system for energizing the rotor coils with phase-displaced signals.

FIG. 4 depicts one arrangement for applying the signals of different phases to four individual rotor coils 40, 41, 42 and 43. As there shown, a variable frequency oscillator 44 is energized over line 24, and has the frequency or timing of its output signals regulated by adjusting knob 26. The pulses from stage 44 are applied over line 45, and passed through a capacitor 46 to a common bus or conductor 47. Capacitor 46 filters out any reference or d-c signal, and thus eliminates the need for brushes or other filter arrangements.

The signal on line 47 is applied through an operational amplifier (op amp) 48 to the first of the rotor windings 40. The signal on common conductor 47 is also applied to the input of a phase shift circuit 50, the output signal of which is passed through a second operational amplifier 51 to the second rotor winding 41. In like manner, the main bus is coupled to another phase shifter 52, which passes its phase-displaced signal through an operational amplifier 53 to the third rotor winding 42. The third phase shifter 54 is also coupled to the main bus 47, and the signal from this phase shift circuit is passed through another operational amplifier 55 to the last or fourth winding 43 of the rotor. Of course if there are additional windings in the rotor, there will be an additional phase shift circuit, and an operational amplifier, for each additional rotor winding in the same manner as illustrated in FIG. 4. The adjustable knobs 56, 57 and 58 shown in the individual phase shift circuits 50, 52 and 54 represent means for adjusting the amount of the phase shift within each of these circuits. This allows for different magnetic field patterns around the rotor to achieve different motor operation characteristics, such as stepping or incremental displacements, or to vary the direction and/or speed of the motor. Of course a similar arrangement is used to provide phase-shifted signals to the individual stator coils, with a separate variable frequency oscillator or other source of signals for application to a main bus in a similar manner. In addition individual phase shifting circuits and operational amplifiers are used to correspondingly regulate the direction and phase of the magnetic field around each of the stator windings in a manner apparent from the foregoing explanation.

Figure 5:
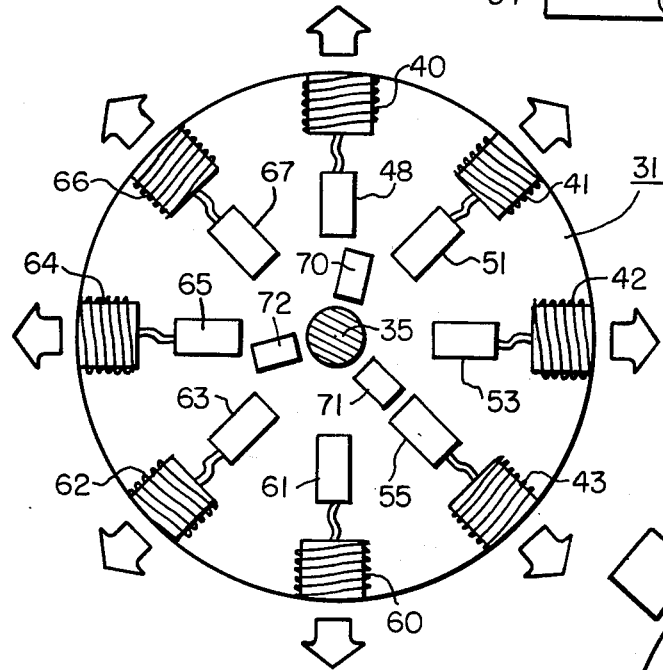
FIGS. 5 and 6 are top and front views, respectively, useful in understanding the positioning and relationship of the rotor coils and associated electronics.

FIG. 5 indicates in plan arrangement one suitable rotor configuration with eight coils placed at equal angular intervals around the periphery of the rotor. The coils include the first four coils 40-43 depicted in FIG. 4, and four additional coils 60, 62, 64 and 66 in the drawing. Four additional op amps are individually coupled to the respective coils as shown. These additional op amps are designated 61, 63, 65 and 67. The phase shift circuits shown individually in FIG. 4 are housed within three integrated circuit (IC) packages 70, 71 and 72 in FIG. 5. The illustration of FIG. 5 is important to demonstrate that the physical sizes of the operational amplifier and phase shifter circuits are now such that they can be incorporated in the interior of the rotor assembly itself. When energized over a common bus, such as conductor 47 in FIG. 4, with each of the phase shift circuits operating to provide a substantially 45° phase shift, the individual fluxes would be outward in the direction depicted by the arrows in FIG. 5. Of course the signal currents and the energizing voltages must be passed along the bus to the conductors, and this is done by means of the brushes 73, 74 as shown generally in the illustrative showing of FIG. 6.

Figure 7:
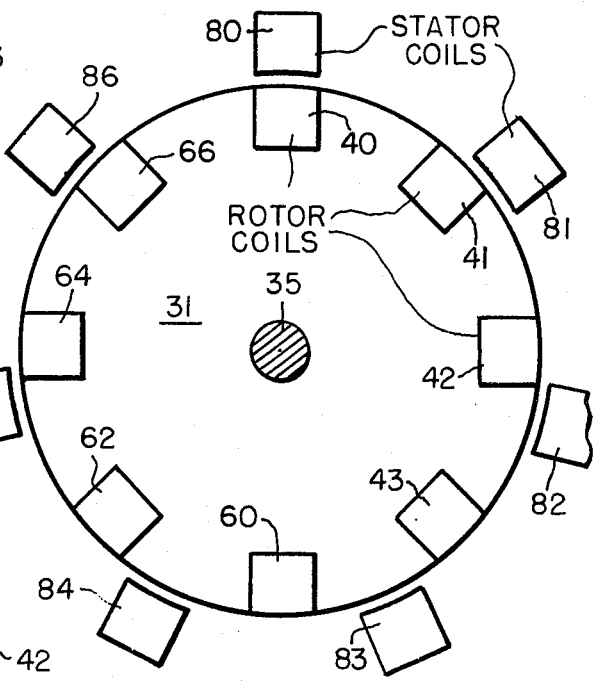
FIG. 7 is an illustrative showing useful in understanding the relationship between the rotor and stator coils in one embodiment.
Figure 6:
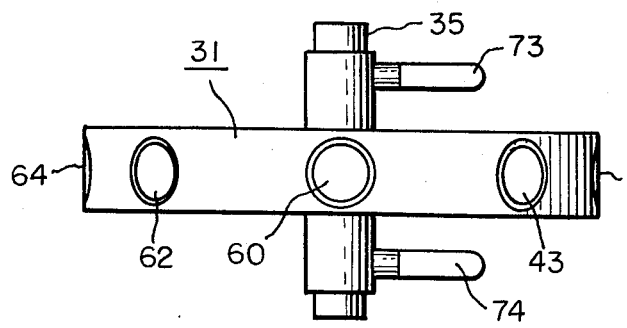

FIG. 7 shows one suitable arrangement for using seven stator coils, designated 80-86 spaced at equal angular increments around the periphery of the stator, together with the rotor windings as shown in FIG. 6. In the illustrated embodiment, each pair of adjacent stator coils are displaced by approximately 51.4° from each other. Thus the position of the rotor with respect to the stator in this arrangement depends jointly upon the magnetic fields produced around the rotor windings, and the separate fields produced by the stator windings as a function of the signals received at those windings. It is the interaction between the coils that produces the mechanical displacement of the rotor and its output shaft 35. Those skilled in the art will appreciate that different numbers of coils, in the rotor as well as the stator, can be used without departing from the basic principles of the invention.

As already described, the rotor signals can be coupled from the external control circuit over brushes, as shown in FIG. 6, to the rotor. Various alternatives are available for passing this information to the rotor coils without brushes. For example, the reference signal for the rotor coils can be magnetically coupled from a stationary coil adjacent the rotor into a coil mounted on and moving with the rotor. Both these coils can be positioned so that their relative angular positions and velocities have negligible effect on the signal induced in the moving rotor coil. This reference rotor signal could also be coupled over a modulated light beam and picked up by a photosensor mounted on the rotor. If desired an additional control circuit, such as a phase-lock loop, could be provided in the rotor to maintain stability of the reference signals during periods in which the coil or photosensor is not actually receiving a signal. The rotor signal would normally be in the audio-frequency range, from zero hertz to 10 kilohertz, but the modulation rate of the accompanying light beam is much higher, in the range of 500 kilohertz to 10 megahertz.

Figure 8:
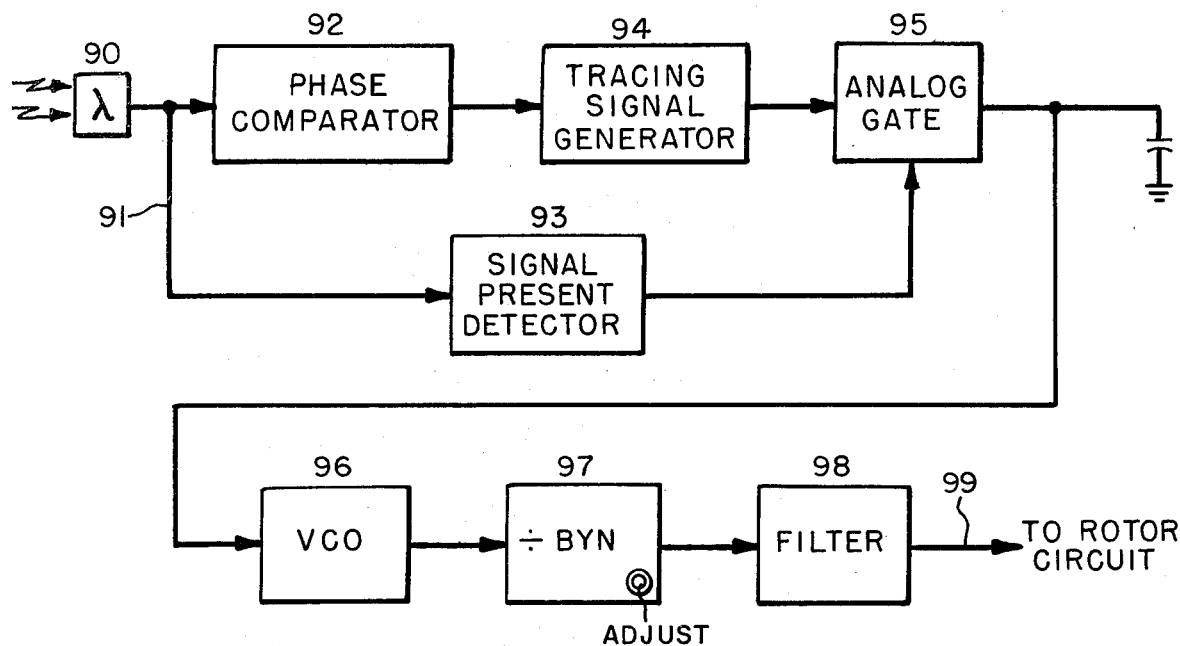
FIG. 8 is a block diagram depicting one arrangement for passing reference signals to the rotor coils without a direct electrical connection.

One circuit for utilizing a modulated light signal is illustrated generally in FIG. 8. As there shown radiation incident on photosensor 90 provides an electrical signal on line 91, which is passed to the input side of a phase comparator 92 and a signal-present detector circuit 93. The output of the phase comparator circuit 92 is an error signal used to regulate synchronization of the tracking-signal generator 94. The output of generator 94 is passed through analog gate circuit 95 only when a signal is received from detector 93. The output of analog gate circuit 95 is a control voltage for regulating the frequency of the output signals from a voltage-controlled oscillator 96. This series of pulses is supplied to a divide-down circuit 97, and the signals in the much lower frequency range are then passed over filter circuit 98 and conductor 99 to the rotor circuit. This is analogous to providing a control signal on line 45 in FIG. 4. Those skilled in the art will readily appreciate the means by which a phaselock loop can be implemented with such an arrangement, or other sampled reference signal arrangements.

Figure 9:
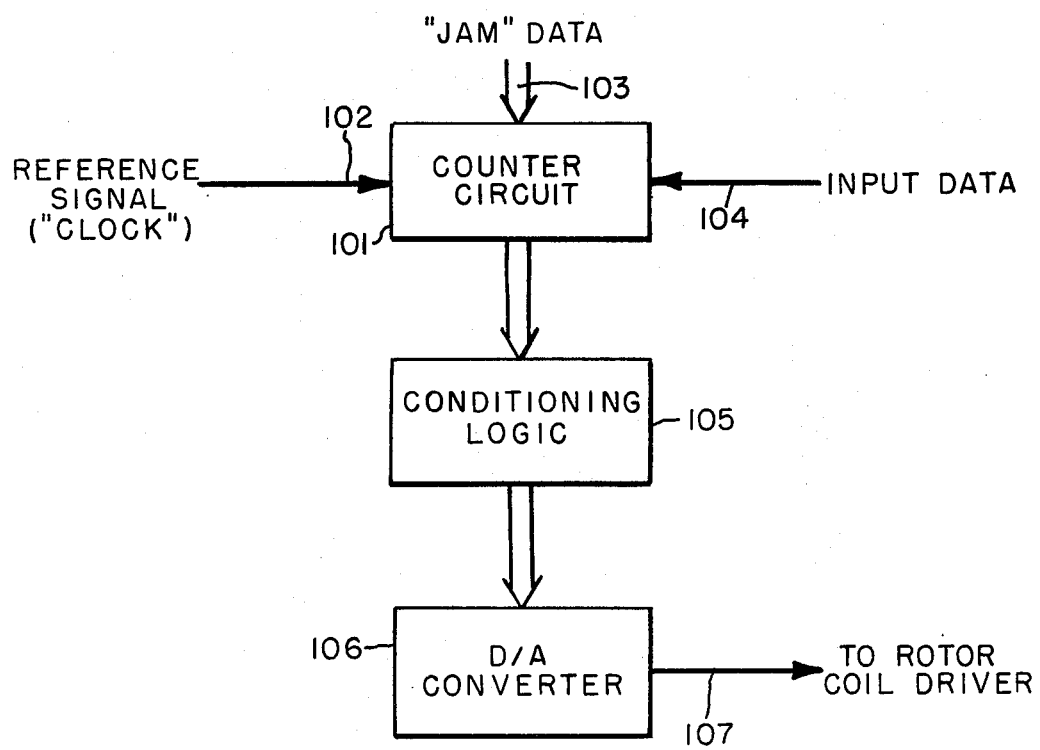
FIG. 9 is a block diagram useful in understanding operation of the invention with a digital data processor.

The present invention lends itself to the fabrication of a precise, miniaturized electrical motor which is virtually insensitive to frequency. In addition such an arrangement is useable in connection with a data processor, such as a microprocessor, which controls the digital signal generation. The implementation of this arrangement is shown generally in FIG. 9.

As there shown, a digital counter circuit 101 receives a reference or "clock" signal from a suitable source, such as a precision oscillator. If the counter circuit 101 includes eight binary stages, or accepts eight bits, then the reference signal would be $2^8$ or 256 times the desired rotor frequency, in that the converter circuits generally provide one cycle of output waveform generation for each complete digital count cycle. The "jam" data shown in line 103 is the representation of an initial pre-load or "jamming" of some initial data value into the counter circuit. By way of example, the circuit shown in FIG. 9 can be duplicated three times to provide three different counters to control a three-phase circuit. To accomplish this the first counter circuit 101 is pre-loaded with an initial count of zero; the second counter is pre-loaded with an initial count of 85; and the third counter is pre-set with a count of 171. Thereafter, as the same clock signal is supplied on line 102 and the same input data information on line 104, the system runs in synchronization.

The output from counter circuit 101 is passed through a conditioning logic circuit 105, for shaping the data pulses, to a digital-to-analog converter 106. The output from D/A converter 106 passed over line 107 to an individual rotor coil, or coil driver circuit. The converter itself can be a limited-precision counter which drives directly a summing junction through just a few resistors. Such networks are now commercially available and provide a relatively simple converter arrangement. A more complex arrangement would include a programmed memory including a sine lookup table in the conditioning logic circuit 105, with the output connections from the logic circuit 105 connecting to a highly linear, fast-operating D/A converter. Both the amplitude and the spectral accuracy of the D/A converter output signal are completely independent of the frequency. Thus this type of solution is especially desirable for variable-frequency application.

In addition to common reference sources such as a quartz-controlled oscillator, the clock signal on line 102 can be derived from sources external to the rotor by brushes, optical coupling (as described above), or some other coupling, such as radio-frequency signals. Likewise it is manifest that both the pre-load or "jam" data and the input data can be derived from circuitry external to the rotor, or carried within the rotor itself, allowing use of more complex phase and/or frequency control arrangements.

The use of a microprocessor allows a virtually unlimited range of control over the operation of the motor. For instance, by changing the "jam" data to the counter circuit, electrical poles can be (in effect) added or deleted from the motor. If power must be conserved and the load on the motor is small, the microprocessor can be programmed to deactivate some of the phase shifters and op amp circuits. The microprocessor can also vary the entire electromagnetic configuration of the motor to give the motor various desired operating characteristics, such as minimal power consumption, advanced or retarded phase shift, and amplitude patterns to enhance response to rapid accelerations in load or torque. Microprocessor circuits can also be designed to store and utilize standard computer programs for any programmable set of instructions. Thus the "means for providing electrical signals" to the stator coils and the rotor coils can be a microprocessor, or a system such as that shown in FIG. 1, or related systems.

Technical Advantages

The present invention provides for precise control of motor speed without any feedback circuit or device. The space, weight and expense are thus reduced by eliminating feedback arrangements. The control circuit can interface directly with electronic devices, such as the data-processor or a preamplifier. No external power supply is required, and such power supplies tend to be large and expensive. Instead, the precise control is achieved with only a few milliwatts of power. The frame of the motor itself serves as a heat sink for the amplifier of this arrangement.

When the motor is driven (as a generator) by rotating shaft 35, recorder 29 stores signals denoting every motion of the motor. A conventional two-channel recorder is available for storage and playback to reproduce the original motion of the shaft. If a d-c supply voltage is passed with the signals to the recorder, a capacitive filter can be used to block the d-c voltage and pass the motion-indicating signals.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. The combination of a motor and a control system, comprising:

an electrical motor, having a stator with a plurality of stator coils spaced at regular intervals, and a rotor mounted on a shaft and having a plurality of rotor coils spaced at regular intervals which may be different than the stator coil intervals;

means for providing electrical signals to the stator coils;

means for providing electrical signals to the rotor coils; and a plurality of phase shift means, each of which is respectively coupled to one of said stator coils and one of said rotor coils, there being one stator coil and one rotor coil to which no phase shift means is coupled, to effect phase displacement of the signals applied to each coil with respect to the signal applied to the adjacent coils.

2. The combination defined in claim 1, in which each of said phase shift means is individually adjustable to vary the amount of the phase shift effected by that particular means.

3. The combination of claim 1, and further comprising a plurality of operational amplifiers, each of which is coupled in series with one of said phase shift means, and two additional operational amplifiers, coupled respectively to the stator coil and the rotor coil which are not coupled to any phase shift means.

4. The combination of claim 3, in which said phase shift means and operational amplifiers are mounted within the motor.

5. The combination of claim 1, in which said means for providing electrical signals to the stator coils and the rotor coils includes first and second cables, and further comprising a recorder coupled to both cables, said recorder being effective to record both the electrical signals provided to the stator coils and the electrical signals provided to the rotor coils.

6. The combination of claim 5, and further comprising a switch arrangement associated with the stator windings, operative when actuated both to interrupt the normal energization of said stator coils and to complete a signal path between one of said stator coils and the recorder, to facilitate recording to signals provided by the motor when the motor shaft is driven.

7. The combination of claim 1, and further comprising an overspeed protection circuit coupled to the means for providing electrical signals to the stator coils and to the rotor coils, operative to interrupt the transfer of said electrical signals when the phase difference between the stator coil signals and the rotor coil signals signifies the motor has reached a preset speed limit.

8. The combination of claim 7, in which the overspeed protection circuit includes a comparator stage which switches when a preset phase difference is sensed, and switching means connected for actuation by the comparator stage to interrupt the signal transfer.

9. The combination of claim 1, and further comprising a data processor connected to supply said electrical signals to the stator coils and to the rotor coils, which data processor includes a counter circuit having an input for receiving "jam" data to set the start-up condition of said counter circuit, thus setting the phase differences between adjacent coils of the rotor and stator.

10. The combination of claim 9, and further comprising a conditioning logic stage connected to receive digital signals from said counter circuit, and a digital-to-analog converter coupled between said conditioning logic stage and one of said coils, to drive said coil with an analog signal related to the output of said counter circuit.

11. The combination of a motor and a control system comprising:

an electrical motor, having a stator with a plurality of stator coils spaced at regular intervals, and a rotor mounted on a shaft and having a plurality of rotor coils spaced at regular intervals which may be different than the stator coil intervals;

means for providing electrical signals to the stator coils;

means for providing electrical signals to the rotor coils;

a plurality of individually adjustable phase shift means, each of which is respectively coupled to one of said stator coils and one of said rotor coils, there being one stator coil and one rotor coil to which no phase shift means is coupled, to effect phase displacement of the signals applied to each coil with respect to the signal applied to the adjacent coils; and a plurality of operational amplifiers, each of which is coupled in series with one of said phase shift means, and two additional operational amplifiers, coupled respectively to the stator coil and the rotor coil which are not coupled to any phase shift means.

12. The combination of claim 11, in which said phase shift means and operational amplifiers are mounted within the motor.

13. The combination of claim 11, in which said means for providing electrical signals to the stator coils and the rotor coils includes first and second cables, and further comprising a recorder coupled to both cables, said recorder being effective to record both the electrical signals provided to the stator coils and the electrical signals provided to the rotor coils, and a switch arrangement associated with the stator windings, operative when actuated both to interrupt the normal energization of said stator coils and to complete a signal path between one of said stator coils and the recorder, to facilitate recording of signals provided by the motor when the motor shaft is driven.

14. The combination of claim 11, and further comprising an overspeed protection circuit coupled to the means for providing electrical signals to the stator coils and to the rotor coils, including a comparator stage which switches when a preset phase difference is sensed, and switching means connected for actuation by the comparator stage to interrupt the signal transfer when the phase difference between the stator coil signals and the rotor coil signals signifies the motor has reached a preset speed limit.

15. The combination of claim 11, and further comprising a data processor connected to supply said electrical signals to the stator coils and to the rotor coils, which data processor includes a counter circuit having an input for receiving "jam" data to set the start-up condition of said counter circuit, thus setting the phase differences between adjacent coils of the rotor and stator, a conditioning logic stage connected to receive digital signals from said counter circuit, and a digital-to-analog converter coupled between said conditioning logic stage and one of said coils, to drive said coil with an analog signal related to the output of said counter circuit.

* * * * *